United States Patent [19]

DeGroot

[11] Patent Number: 5,509,391
[45] Date of Patent: Apr. 23, 1996

[54] HELMOLTZ ISOLATION SPOOL VALVE ASSEMBLY ADAPTED FOR A HYDRAULICALLY-ACTUATED FUEL INJECTION SYSTEM

[75] Inventor: Jeffrey L. DeGroot, Metamora, Ill.

[73] Assignee: Caterpillar Inc., Peoria, Ill.

[21] Appl. No.: 316,759

[22] Filed: Oct. 3, 1994

[51] Int. Cl.$^6$ .................................... F02M 41/00
[52] U.S. Cl. ..................... 123/467; 123/456; 137/118
[58] Field of Search ................... 123/467, 447, 123/446, 456; 137/118, 119, 101

[56] References Cited

U.S. PATENT DOCUMENTS

| | | | |
|---|---|---|---|
| 2,643,664 | 6/1953 | Willett | 137/101 |
| 3,554,213 | 1/1971 | Yoshino | 137/118 |
| 4,054,327 | 10/1977 | Rebenstorf | 137/118 |
| 4,231,441 | 11/1980 | Burckhardt | 137/118 |
| 4,564,039 | 1/1986 | Kalmanczhelyi | 137/101 |
| 5,168,855 | 12/1992 | Stone | 123/467 |
| 5,181,494 | 1/1993 | Ausman et al. | 123/446 |
| 5,191,867 | 3/1993 | Glassey | 123/446 |
| 5,213,083 | 5/1993 | Glassey | 123/447 |
| 5,245,970 | 9/1993 | Iwaszkiewicz | 123/447 |
| 5,280,773 | 1/1994 | Henkel | 123/467 |
| 5,311,850 | 5/1994 | Martin | 123/467 |
| 5,375,576 | 12/1994 | Ausman | 123/467 |

FOREIGN PATENT DOCUMENTS 666142  7/1963  Canada .................. 137/118

*Primary Examiner*—Carl S. Miller
*Attorney, Agent, or Firm*—Anthony N. Woloch

[57] ABSTRACT

A spool valve assembly for isolating and/or minimizing actuating fluid pressure fluctuations between a pair of actuating fluid manifolds in a hydraulically-actuated fuel injection system. The spool valve assembly may be integrally formed with an actuating fluid supply pump or positioned remote therefrom in the fluid flowpath between the supply pump and the pair of actuating fluid manifolds.

7 Claims, 2 Drawing Sheets

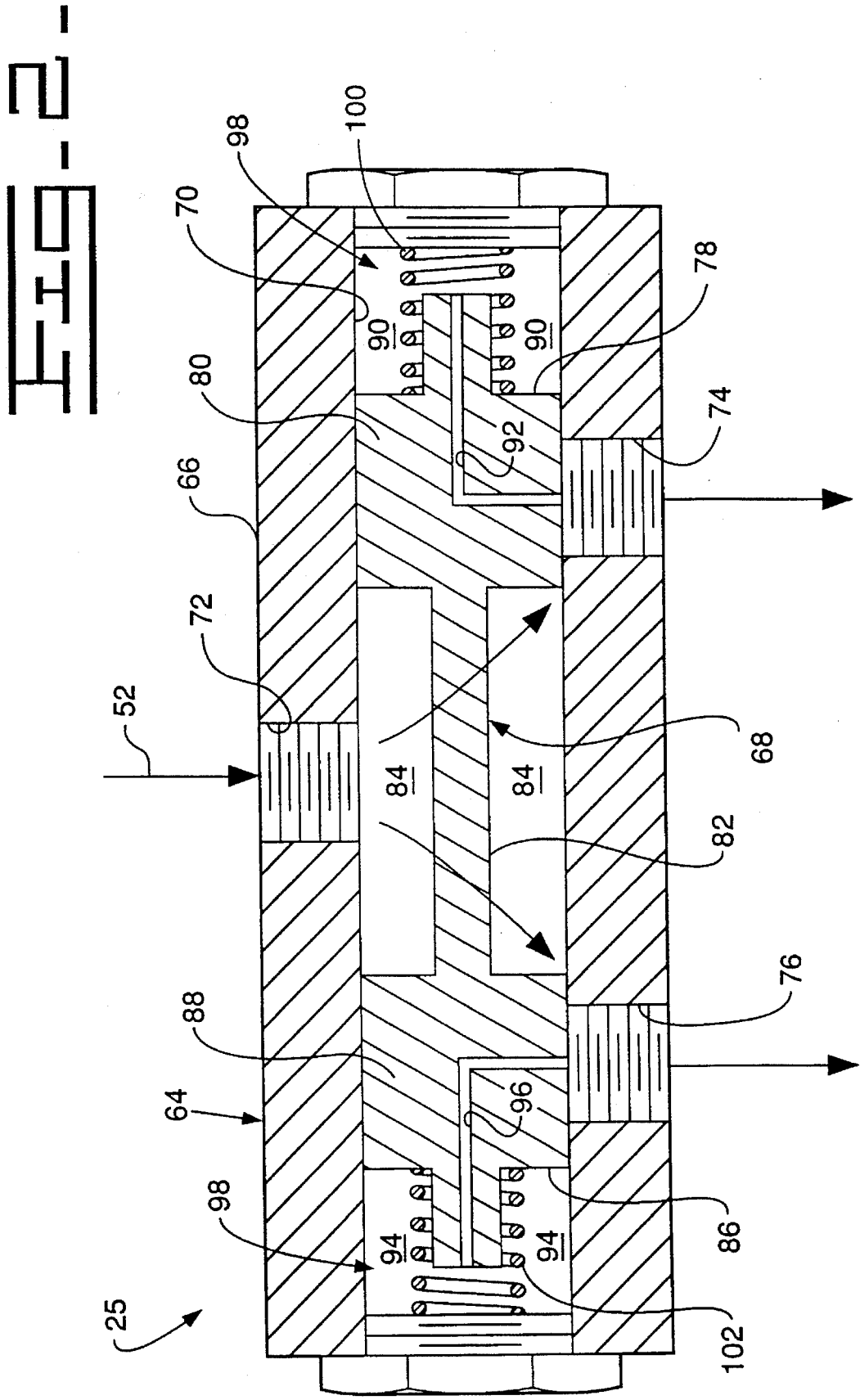

HELMOLTZ ISOLATION SPOOL VALVE ASSEMBLY ADAPTED FOR A HYDRAULICALLY-ACTUATED FUEL INJECTION SYSTEM

TECHNICAL FIELD

The present invention relates generally to hydraulically-actuated fuel injection systems and, more particularly, to devices for controlling Helmholtz resonation.

BACKGROUND ART

U.S. Pat. No. 4,459,959 issued to Terada et al. on Jul. 17, 1984, U.S. Pat. No. 4,372,272 issued to Walter et al. on Feb. 8, 1983, and U.S. Pat. No. 5,168,855 issued to Stone on Dec. 8, 1992 disclose hydraulically-actuated injector fuel systems.

Hydraulically-actuated injector fuel systems, having multiple manifolds for supplying high pressure actuating fluid to the injectors, can create a Helmholtz resonance effect between the manifolds. The Helmholtz resonance effect is caused by high pressure pressure waves that reflect back and forth between the manifolds which are supplied by a common high pressure pump. The pressure waves are created as a result of a temporary loss of pressure in one of the manifolds when an injector, communicating with that manifold, has used actuating fluid in order to effect fuel injection. The creation of a Helmholtz resonance effect between the manifolds causes the manifold pressures to be nonuniform which then interferes with the intended sequence of fuel injections by the injectors.

The present invention is directed to overcoming one or more of the problems as set forth above.

DISCLOSURE OF THE INVENTION

In one aspect of the present invention a fuel injection system is disclosed comprising an actuating fluid supply pump, a first set of at least one hydraulically-actuated fuel injector, a first actuating fluid manifold arranged in fluid communication with each of the first set of fuel injector(s), a second set of at least one hydraulically-actuated fuel injector, a second actuating fluid manifold arranged in fluid communication with each of the second set of fuel injector(s), and means for controlling Helmholtz resonance of pressure waves between the first and second manifolds. The Helmholtz resonance controlling means includes a spool valve assembly operative to communicate actuating fluid from one manifold to the other manifold when the actuating fluid pressure in said other manifold is lower than the pressure in said one manifold.

Hydraulically-actuated injector fuel systems, having a pump and at least one manifolds for supplying high pressure actuating fluid to the injectors, can establish a Helmholtz resonance of pressure waves between the manifolds and/or between the pump and either manifold. The spool valve assembly minimizes cross fluid pressure inflections between the first and second sets of fuel injector(s) and also ensures that a desired actuating fluid pressure is uniformly supplied to each fuel injector. Consequently, uniform or even fuel delivery performance between the injectors is achieved.

BRIEF DESCRIPTION OF THE DRAWINGS

FIG. 2 is a diagrammatic cross-sectional view of a spool valve assembly, shown in FIG. 1, for isolating actuating fluid pressure fluctuations.

BEST MODE FOR CARRYING OUT THE INVENTION

Figure 1:
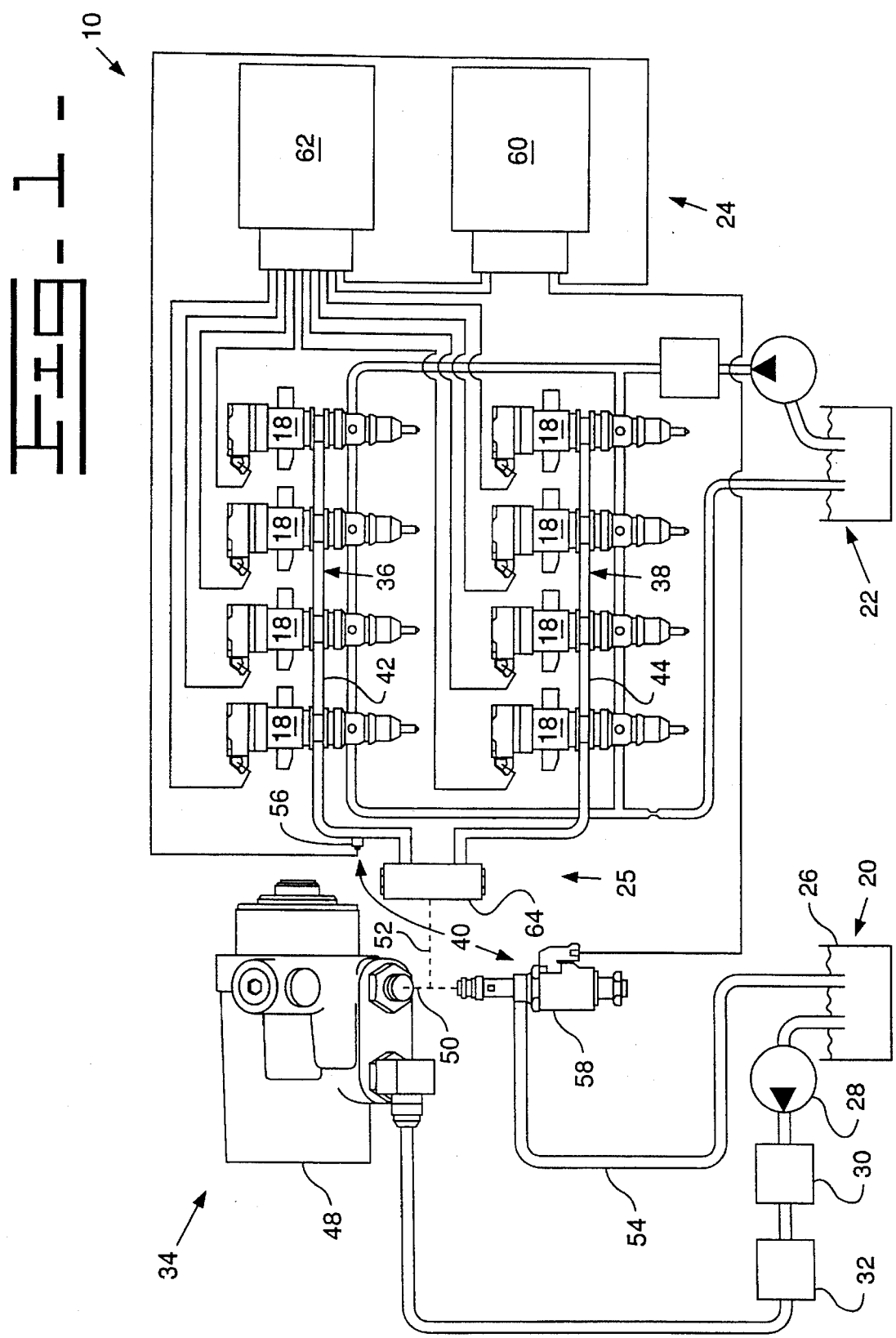
FIG. 1 is a diagrammatic general schematic view of one embodiment of a hydraulically-actuated electronically-controlled injector fuel system of the present invention.

Referring to FIG. 1, wherein similar reference numerals designate similar elements or features throughout FIGS. 1–9, there is shown an embodiment of a hydraulically-actuated electronically-controlled fuel injection system 10 (hereinafter referred to as a HEUI fuel system).

The exemplary HEUI fuel system 10 is shown in FIG. 1 as adapted for a direct-injection diesel-cycle internal combustion engine. While the embodiment of FIG. 1 is shown applicable to a vee-type eight-cylinder engine, it should be understood that the present invention is also applicable to other types of engines, such as in-line engines and rotary engines, and that the engine may contain fewer or more than eight cylinders or combustion chambers. Preferably, the engine has at least one cylinder head (not shown) which defines one or more injector bores (not shown).

The HEUI fuel system 10 includes one or more hydraulically-actuated electronically-controlled injectors 18 (for example, unit fuel injectors) adapted to be positioned in a respective injector bore. The system 10 further includes apparatus or actuating fluid supplying means 20 for supplying hydraulically-actuating fluid to each injector 18, apparatus or fuel supplying means 22 for supplying fuel to each injector 18, apparatus or electronically-controlling means 24 for electronically controlling the fuel injection quantity, injection timing, and/or fuel injection pressure of the injectors 18 independent of engine speed and load, and apparatus or Helmholtz resonance controlling means 25 for controlling Helmholtz resonance of actuating fluid pressure waves. Further details of an exemplary HEUI fuel system 10, generally relating to the instant invention but not teaching or suggesting the instant invention, are disclosed in the above-mentioned U.S. Pat. No. 5,168,855 (Stone).

The hydraulically actuating fluid supplying means 20 preferably includes an actuating fluid sump 26, a relatively low pressure actuating fluid transfer pump 28, an actuating fluid cooler 30, one or more actuating fluid filters 32, a source or actuating fluid pressurizing means 34 for pressurizing actuating fluid to a relatively higher pressure than that delivered to it by the transfer pump 28, first and second relatively high pressure actuating fluid manifolds 36,38, and a actuating fluid pressure controlling means 40 for electronically or variably controlling the magnitude of the actuating fluid pressure supplied to the injectors 18 via the manifold(s) 36,38.

Preferably, the fluid chosen for the actuating fluid is not fuel but is a relatively incompressible liquid having a relatively higher viscosity than fuel under the same operating conditions. Preferably, the actuating fluid is engine lubricating oil and the actuating fluid sump 26 is an engine lubrication oil sump, crankcase, or oil pan. Alternatively, the actuating fluid may be fuel.

Preferably, one actuating fluid manifold 36,38 is provided for and associated with each cylinder head having a bank or set of at least one injector(s) 18. Each manifold 36,38 accumulates pressurized actuating fluid delivered by the pressurizing means 34 and intermittently feeds such pressurized actuating fluid to an actuating fluid inlet passage of each hydraulically-actuated fuel injector 18 associated with that manifold. Each actuating fluid manifold 36,38 has one common rail passage 42,44 and a plurality of individual rail branch passages.

Each common rail passage 42,44 is arranged downstream of the pressurizing means 34 and is in fluid communication between the pressurizing means 34 and the respective bank of injectors 18. The number of rail branch passages for each manifold 36,38 corresponds to the number of injectors 18 positioned in each cylinder head. Each rail branch passage extends between its respective common rail passage 42,44 and an actuating fluid inlet passage of a respective injector 18.

Preferably, the pressurizing means 34 is a an actuating fluid supply pump 48. For example, the pump 48 may be a gear-driven fixed-displacement axial piston pump 48. Alternatively, the pump may be an electronically-controlled variable-displacement axial piston pump. As schematically shown in FIG. 1, the actuating fluid pump 48 includes first, second, and third internal passages 50,52,54. The first passage 50 is adapted to be in fluid communication with the relatively high pressure pumping chamber(s) of the pump 48. The second passage 52 is adapted to be in selective fluid communication with the manifolds 36,38. The third passage 54 is adapted to be in continuous fluid communication with the relatively low pressure actuating fluid sump 26.

As shown in FIGS. 1 and 2, preferably, the actuating fluid pressure controlling means 40 includes at least one actuating fluid pressure sensor or transducer 56 and a proportional pressure control valve assembly 58 also hereinafter called a rail pressure control valve assembly or "RPCV". Preferably, the sensor 56 is positioned in one of the manifolds 36,38 downstream of the pump 48 but upstream of all the injectors 18. Preferably, the RPCV 58 is of the pilot-operated type when it must be capable of operating with high fluid pressures. Preferably, the RPCV 58 is adapted to be installed in the backplate or portplate of the pump 48 as shown in FIG. 1. As shown in FIG. 1, the RPCV 58 is adapted to selectively bypass a variable amount of actuating fluid from the relatively high pressure pump 48 to the third passage 54 and then back to the relatively low pressure sump 26.

The means 24 for electronically controlling the fuel injection quantity, injection timing, and/or fuel injection pressure of the injectors 18 preferably includes a electronic control module 60 or digital microprocessor (hereinafter referred to as an "ECM") and an electronic driver unit 62 (hereinafter referred to as an "EDU"). The ECM 60 includes software decision logic and information defining optimum fuel system operational parameters and controls both the RPCV 58 (in the case of a fixed-displacement pump 48 or, alternatively, the variable-displacement pump 48) and the injectors 18. One or more sensor signals, indicative of various engine parameters, are delivered to the ECM 60 to identify the engine's current operating condition. The ECM 60 uses these input signals to control the operation of the injectors 18 in terms of fuel injection quantity, injection timing, and injection pressure independent of engine speed and load. The ECM 60 is electrically connected to the EDU 62 and the EDU 62 is electrically connected to the solenoid or another type of electrical actuator of each injector 18 in order to electronically control each injector 18. The sensor 56 is electrically connected to the ECM 60 in order to provide signals indicative of the magnitude of the actuating fluid pressure in the manifolds 36,38.

The Helmholtz resonance controlling means 25 is adapted to control Helmholtz resonance of actuating fluid pressure waves between the first and second manifolds 36,38. The Helmholtz resonance controlling means 25 includes a spool valve assembly 64 operative to communicate actuating fluid from one manifold to the other manifold only when the actuating fluid pressure in said other manifold is lower than the pressure in said one manifold. As shown in FIG. 1, the spool valve assembly 64 is positioned in fluid communication between the actuating fluid supply pump 48 and each of the first and second manifolds 36,38. Alternatively, the spool valve assembly 64 may be integrally formed with the actuating fluid supply pump upstream of the first and second manifolds 36,38.

The spool valve assembly 64 includes a housing 66 and a spool valve 68. The housing 66 defines a housing bore 70, an inlet port 72 arranged in fluid communication with and downstream of the actuating fluid supply pump 48, a first outlet port 74 arranged in fluid communication with the first manifold 36, and a second outlet port 76 arranged in fluid communication with the second manifold 38. The spool valve 68 is positioned in the housing bore 70 and axially movable amongst a first, second, and third positions. At the first position of the spool valve 68, fluid communication is blocked between the inlet port 72 and each of the first and second outlet ports 74,76. At the second position of the spool valve 68, fluid communication is opened between the inlet port 72 and the first outlet port 74 and fluid communication is blocked between the inlet port 72 and the second outlet port 76. At the third position of the spool valve 68, fluid communication is blocked between the inlet port 72 and the first outlet port 74 and fluid communication is opened between the inlet port 72 and the second outlet port 76.

The spool valve 68 has a first end portion 78 defining a first land 80, a reduced-diameter intermediate portion 82 defining with the housing 66 an annular spool chamber 84, and a second end portion 86 defining a second land 88. The housing 66 and first end portion 78 of the spool valve 68 define a first chamber 90 arranged in continuous fluid communication with the first outlet port 74 via a fluid passage 92 defined in the first end portion 78 of the spool valve 68. The housing 66 and second end portion 86 of the spool valve 68 define a second chamber 94 arranged in continuous fluid communication with the second outlet port 76 via a fluid passage 96 defined in the second end portion 86 of the spool valve 68.

The valve assembly 64 further includes biasing means 98 for biasing the spool valve 68 to its first position. Preferably, the biasing means 98 includes first and second springs 100,102. The first spring 100 is preferably a helical compression spring having a first effective spring rate. The first spring 100 is positioned in the first chamber 90 between the housing 66 and the first end portion 78 of the spool valve 68. The second spring is preferably a helical compression spring having a second effective spring rate. The second spring 102 is positioned in the second chamber 94 between the housing 66 and the second end portion 86 of the spool valve 68. The first and second effective spring rates are preferably equal.

Industrial Applicability

In operation, the spool valve assembly 64 receives actuating fluid from the supply pump 48 and selectively directs such actuating fluid to one of the first and second manifolds 36,38. Actuating fluid from the supply pump 48 enters the spool chamber 84 via inlet port 72 at a variably selected first pressure (for example, about 23 MPa or 3340 psi). When the actuating fluid pressure in each of the first and second manifolds 36,38 are at the first pressure, the spool valve 68 assumes its first or centered position. This is achieved by the opposed equal spring forces acting on the spool valve 68 and also the equal fluid pressures acting on the first end portion 78, intermediate portion 82, and second end portion 86 of the spool valve 68. At its first position, the spool valve 68 will not allow actuating fluid flow to either manifold 36,38 due to the outlet ports 74,76 being blocked by the respective lands 80,88 of the spool valve 68.

When the actuating fluid pressure lowers in one of the manifolds (for example, manifold 36) due to an injector 18 firing and consuming actuating fluid flow and pressure from its respective manifold, the fluid pressure lessens in the corresponding chamber (in this example, chamber 90). The relatively lower fluid pressure in such chamber compared to the other chamber (in this example, chamber 94) causes the spool valve 68 to axialy move (rightward according to FIG. 2). This will uncover the outlet port (in this example, port 74) to the manifold (in this example, manifold 36) having the relatively lower fluid pressure until the fluid pressures in the chamber 90,94 are again equalized. Simultaneously, when the spool valve 68 is axially moved to its second or third positions, the opposite outlet port 74,76 is blocked by the respective land 80,88 of the spool valve 68 thus not allowing and communication of actuating fluid pressure or flow either back to the supply pump 48 or to the other actuating fluid manifold of the engine.

The Helmholtz resonance controlling means 25 is provided in order to controllably minimize or prevent the creation of Helmholtz resonance of pressure waves which would naturally occur between the two interconnected high pressure manifolds 36,38 and also the pump 48 and either manifold 36,38. Controlling Helmholtz resonance helps to maintain a more uniform pressure over time in each manifold 36,38 at a given pressure setting of the valve 58. More specifically, the spool valve assembly 64 minimizes cross fluid pressure inflections between the first and second sets of fuel injector(s) 18 and also ensures that actuating fluid pressure is uniformly supplied to each fuel injector 18. Consequently, uniform or even fuel delivery performance between the injectors 18 is achieved.

Other aspects, objects, and advantages of this invention can be obtained from a study of the drawings, the disclosure, and the appended claims.

I claim:

1. A fuel injection system comprising:
   an actuating fluid supply pump;
   a first plurality of hydraulically-actuated fuel injectors;
   a first actuating fluid manifold arranged in fluid communication with each of the first plurality of fuel injectors;
   a second plurality of hydraulically-actuated fuel injectors;
   a second actuating fluid manifold arranged in fluid communication with each of the second plurality of fuel injectors;
   means for controlling Helmholtz resonance of pressure waves between the first and second manifolds wherein said Helmholtz resonance controlling means includes a spool valve assembly operative to communicate actuating fluid from said actuating fluid supply pump to one of said manifolds only when the actuating fluid pressure in said other manifold is lower than the pressure in said one manifold.

2. The fuel injection system of claim 1 wherein said valve assembly includes a housing and a spool valve, said housing defining a housing bore, an inlet port arranged in fluid communication with the actuating fluid supply pump, a first outlet port arranged in fluid communication with the first manifold, a second outlet port arranged in fluid communication with the second manifold, said spool valve positioned in the housing bore and movable amongst a first position at which fluid communication is blocked between the inlet port and each of the first and second outlet ports, a second position at which fluid communication is opened between the inlet port and the first outlet port and fluid communication is blocked between the inlet port and the second outlet port, and a third position at which fluid communication is blocked between the inlet port and the first outlet port and fluid communication is opened between the inlet port and the second outlet port.

3. The fuel injection system of claim 2 wherein said spool valve has first and second end portions, said housing and first end portion of the spool valve defining a first chamber arranged in fluid communication with the first outlet port, said housing and second end portion of the spool valve defining a second chamber arranged in fluid communication with the second outlet port.

4. The fuel injection system of claim 3 wherein said valve assembly further includes biasing means for biasing the spool valve to its first position.

5. The fuel injection system of claim 4 wherein said biasing means includes a first and second helical compression springs, said first spring having a first effective spring rate and positioned in the first chamber between the housing and the first end portion of the spool valve, said second spring having a second effective spring rate and positioned in the second chamber between the housing and the second end portion of the spool valve, said first and second effective spring rates being equal.

6. The fuel injection system of claim 1 wherein said spool valve assembly is positioned in fluid communication between the actuating fluid supply pump and each of the first and second manifolds.

7. The fuel injection system of claim 1 wherein said spool valve assembly is integrally formed with the actuating fluid supply pump upstream of the first and second manifolds.

\* \* \* \* \*